United States Patent
Bisht et al.

(10) Patent No.: US 9,104,570 B2
(45) Date of Patent: Aug. 11, 2015

(54) METHOD FOR MONITORING AT LEAST TWO MICROCONTROLLERS

(75) Inventors: Sandeep Bisht, Reutlingen (DE);
Jochen Weber, Asperg (DE); Andreas Heyl, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 183 days.

(21) Appl. No.: 13/825,248

(22) PCT Filed: Sep. 8, 2011

(86) PCT No.: PCT/EP2011/065515
§ 371 (c)(1),
(2), (4) Date: Jun. 21, 2013

(87) PCT Pub. No.: WO2012/038260
PCT Pub. Date: Mar. 29, 2012

(65) Prior Publication Data
US 2014/0149809 A1 May 29, 2014

(30) Foreign Application Priority Data
Sep. 20, 2010 (DE) .................. 10 2010 041 003

(51) Int. Cl.
 *G06F 11/00* (2006.01)
 *G06F 11/07* (2006.01)
 *G05B 19/042* (2006.01)

(52) U.S. Cl.
 CPC ........ *G06F 11/0757* (2013.01); *G05B 19/0428* (2013.01); *G06F 11/076* (2013.01); *G06F 11/0739* (2013.01); *G05B 2219/25158* (2013.01)

(58) Field of Classification Search
 CPC  G06F 11/0739; G06F 11/0757; G06F 11/076
 See application file for complete search history.

(56) References Cited

U.S. PATENT DOCUMENTS

| | | | |
|---|---|---|---|
| 2005/0251704 A1* | 11/2005 | Wagner et al. | 714/47 |
| 2005/0268178 A1 | 12/2005 | Hagman | |
| 2008/0015713 A1* | 1/2008 | Pannwitz | 700/8 |

(Continued)

FOREIGN PATENT DOCUMENTS

| | | |
|---|---|---|
| DE | 102 05 809 A1 | 12/2002 |
| DE | 102 11 280 A1 | 9/2003 |

(Continued)

OTHER PUBLICATIONS

International Search Report corresponding to PCT Application No. PCT/EP2011/065515, mailed Nov. 22, 2011 (German and English language document) (5 pages).

*Primary Examiner* — Charles Ehne
(74) *Attorney, Agent, or Firm* — Maginot, Moore & Beck LLP

(57) ABSTRACT

A method for monitoring at least two microcontrollers using a watchdog is described. The watchdog is associated with a first microcontroller and monitors the communication of a message from the first microcontroller within a time interval of a predefined duration. The message communicated to the watchdog by the first microcontroller contains a contribution which is formed on account of communication between the first microcontroller and a second microcontroller connected to the latter and on the basis of which the watchdog checks the proper method of operation of the second microcontroller. The disclosure also describes a circuit arrangement and a battery with a battery management unit which are configured to carry out the method according to the disclosure.

12 Claims, 1 Drawing Sheet

(56) References Cited

U.S. PATENT DOCUMENTS

2008/0268178 A1  10/2008  Ustinov et al.
2009/0249271 A1*  10/2009  Yamada et al. .................. 716/6

FOREIGN PATENT DOCUMENTS

EP          1 600 831 A1    11/2005
JP         2010-200552 A      9/2010

* cited by examiner

METHOD FOR MONITORING AT LEAST TWO MICROCONTROLLERS

This application is a 35 U.S.C. §371 National Stage Application of PCT/EP2011/065515, filed on Sep. 8, 2011, which claims the benefit of priority to Serial No. DE 10 2010 041 003.9, filed on Sep. 20, 2010 in Germany, the disclosures of which are incorporated herein by reference in their entirety.

The present disclosure relates to a method for monitoring at least two microcontrollers using a watchdog, a circuit arrangement which is designed to carry out the method according to the disclosure, and a battery and a motor vehicle which comprise the circuit arrangement according to the disclosure.

BACKGROUND

From the prior art, methods for monitoring a microcontroller using a watchdog are known in which an external hardware watchdog having an independent time base and fixed time window is used for logically and temporally monitoring the program sequence of safety-related program parts of the microcontroller. Such a watchdog is used, for example, as part of the monitoring of motor controllers in which a so-called three-level concept is applied. In this context, a first level comprises the software for controlling the motor, a second level comprises the software for monitoring the motor controller and finally a third level comprises the software for monitoring the hardware used on the first two levels. In this context, a hardware watchdog is used on the third level in order to check a microcontroller used on the first or second level.

In a simple configuration, monitoring the microcontroller using the watchdog can consist in the watchdog monitoring the arrival of reset pulses within a time interval of predetermined duration and initiating a reset of the microcontroller when the reset pulses do not arrive. In a configuration developed further, the watchdog can communicate test questions to the microcontroller and check its answers for correctness and time.

Such a method for monitoring a microcontroller can have the following sequence: the watchdog asks the microcontroller randomly one of several possible questions. The microcontroller forms an answer to this question by combining two answer contributions. The first answer contribution is obtained from a test of the logic of the microcontroller. The second answer contribution is obtained from a function-specific checking of a predetermined multiplicity of software modules, preferably with additional conditions such as correct order and a predetermined number of call ups of each module. The two answer contributions are combined and transmitted to the watchdog in a particular time window. The watchdog checks the answer for correct content and correct reception in time and increments an error counter when an error is detected or resets the error counter if no error is found. After that, the checking method is continued by the watchdog by asking a new question.

If the error counter of the watchdog exceeds a predetermined threshold, the watchdog initiates a safety-related method step which, for example, can consist in the output stages of the system driven by the microcontroller being switched off so that no further operation is possible.

Watchdogs implemented in hardware are usually constructed in a very simple manner and allow communication with only one microcontroller in each case so that, according to the prior art, monitoring of several microcontrollers is only possible by using the same number of watchdogs.

SUMMARY

According to the disclosure, a method for monitoring at least two microcontrollers by means of one watchdog is provided. The watchdog is allocated to a first microcontroller and monitors the communication of a message of the first microcontroller within a time interval of predetermined duration. If a first component communicates a message to a second component, especially a question or answer, this can mean within the context of the disclosure that the first component sends the message to the second component, for example on a bus system, or that it provides the message, for example by storage in a register and the second component interrogates this message. The watchdog is usually supplied with a clock signal which differs from the clock signal of the microcontroller so that it can check the correct reception of the message in time. It is provided that the message communicated to the watchdog by the first microcontroller contains a contribution which is formed as a consequence of a communication between the first microcontroller and a second microcontroller connected to the former. On the basis of this contribution, the watchdog checks the correct method of operation of the second microcontroller in addition to that of the first microcontroller.

By means of the extended monitoring concept provided according to the disclosure, two microcontrollers can be monitored by one watchdog. It is thus possible to save an additional watchdog for the second microcontroller and also a disconnecting path allocated to the second microcontroller. However, the disclosure is not restricted to monitoring two microcontrollers. Instead, a multiplicity of microcontrollers can also be monitored jointly by one watchdog. In particular, the second microcontroller does not need to be connected directly to the first microcontroller. Instead, it is sufficient that it is connected to the first microcontroller indirectly, for example via a third microcontroller. In such an arrangement, the third microcontroller can be used as transmitting unit for the messages exchanged between the first and second microcontroller and, according to the disclosure, both the second and the third microcontroller can be monitored by the watchdog.

The message of the first microcontroller can comprise an answer to a question which has previously been communicated to the first microcontroller by the watchdog. The watchdog communicates the question to the first microcontroller typically at a time which forms the beginning of the time interval of predetermined duration. The watchdog thus determines a correct method of operation of both microcontrollers only when both question and answer are exchanged within the time interval.

It is preferred that the answer comprises a first contribution which is formed by the first microcontroller and a second contribution which is formed by the second microcontroller and communicated to the first microcontroller. In this context, the question can be communicated to the second microcontroller by the first microcontroller before the second contribution of the answer is formed by the second microcontroller. This communication also occurs typically within the predetermined time interval.

It is also preferred that the first contribution of the answer, which is formed by the first microcontroller, comprises a component-specific component which results from a check of system components of the first microcontroller, especially the logic of a main processor of the first microcontroller, and/or a function-specific component which results from a check of a plurality of software modules of the first microcontroller.

For the second contribution of the answer which is formed by the second microcontroller, various variants can be provided depending on the magnitude of the requirements set for monitoring the second microcontroller.

If high requirements are set for monitoring the second microcontroller, the second contribution of the answer can also comprise a component-specific component and/or a function-specific component as is also provided in the case of the first contribution of the answer.

In the case of lesser requirements, the second contribution of the answer can consist only of a digital word, wherein individual bits of the digital word represent the correct method of operation of individual software modules of the second microcontroller. Optionally, the second contribution of the answer can be supplemented here by a question-specific component which, in particular, is formed by reading out a table stored in the second microcontroller.

The watchdog can increment an error counter with at least one detected error of the first or second microcontroller, or initiate a safety-related method step, for example turning off the output stages of the system driven by the microcontroller, when the error counter has reached a predetermined value.

A further aspect of the disclosure relates to a circuit arrangement comprising a first microcontroller, a watchdog allocated to the latter, and at least one second microcontroller connected to the first microcontroller. The circuit arrangement is designed for executing the method according to the disclosure.

Further aspects of the disclosure relate to a battery, preferably a lithium-ion battery, with a battery management unit which comprises the circuit arrangement according to the disclosure, and a motor vehicle which comprises the battery according to the disclosure. The motor vehicle can be an electrical motor vehicle in which the battery is connected to the propulsion system of the motor vehicle.

BRIEF DESCRIPTION OF THE DRAWINGS

Exemplary embodiments of the disclosure will be explained in greater detail with reference to the drawings and the subsequent description.

DETAILED DESCRIPTION

Figure 1:
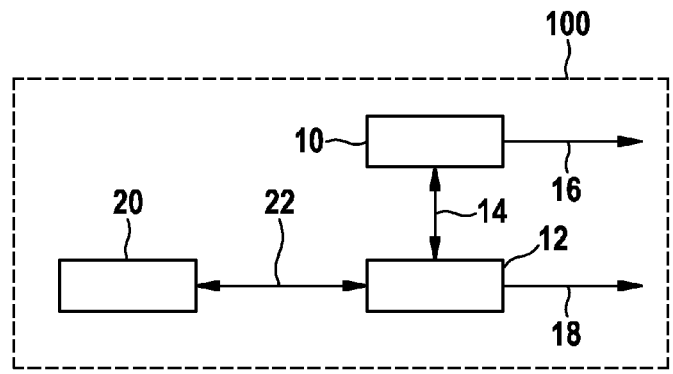
FIG. 1 shows a battery with a circuit arrangement according to one embodiment of the disclosure and FIG. 2 shows a flow chart of a method for monitoring two microcontrollers according to one embodiment of the disclosure.

FIG. 1 shows a battery designated by 100 overall, preferably a lithium-ion battery which comprises a circuit arrangement according to one embodiment of the disclosure. A hardware watchdog 10 is allocated to a first microcontroller 12 and connected to the latter via a bus 14, messages being exchanged in both directions via the bus 14, especially the questions of the watchdog 10 and associated answers of the first microcontroller 12. Both the watchdog 10 and the first microcontroller 12 have disconnecting paths 16, 18 via which, when a safety-critical situation is found, a high-voltage circuit breaker, not shown, of the battery 100 can be opened.

The first microcontroller 12 is connected to a second microcontroller 20 via a bus 22 via which messages are exchanged also in both directions, especially a question of watchdog 10, forwarded by the first microcontroller 12, and an associated answer of the second microcontroller 20. Due to the fact that the second microcontroller 20 receives a question of the watchdog 10 via the first microcontroller 12 and sends back an associated answer in the same way, the watchdog 10 can check the correct method of operation of the second microcontroller 20 and, when an error is found, open the high-voltage circuit breakers of the battery via the disconnecting path 16. It is thus not required to provide a separate disconnecting path to which the second microcontroller 20 has direct access.

Figure 2:
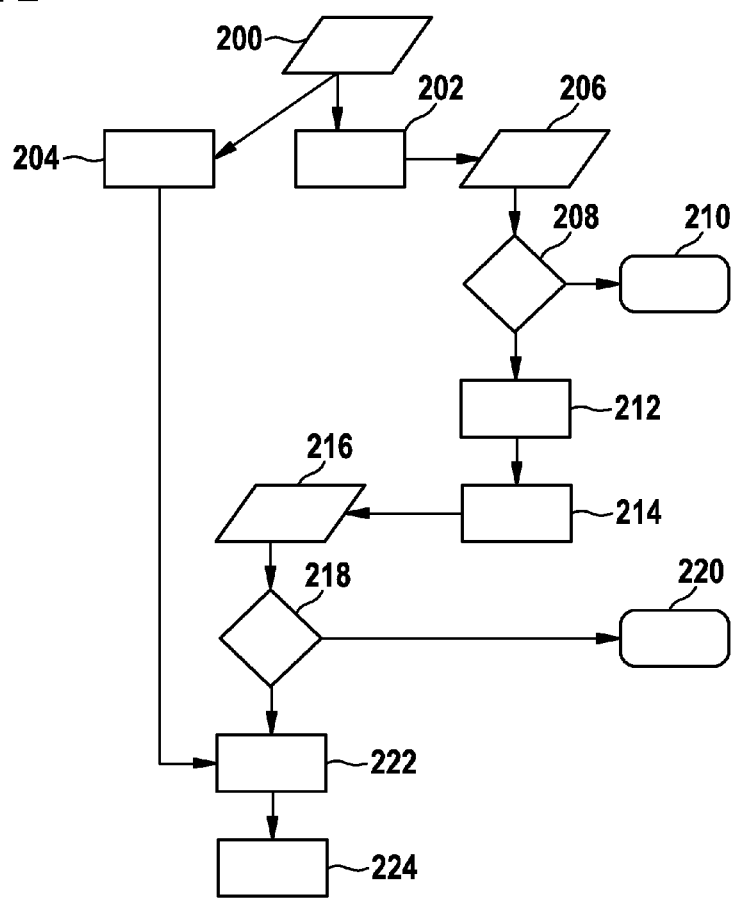

FIG. 2 shows a flow chart of the method according to the disclosure. In method step 200, a question of the watchdog 10 is asked of the first microcontroller 12. In method step 202, the question of the watchdog 10 is communicated to the second microcontroller 20 by the first microcontroller 12, either by sending the question to the second microcontroller 20 or by providing for an interrogation of the second microcontroller 20. In method step 204, a first contribution of the answer is formed in the first microcontroller 12. In method step 206, the second microcontroller 20 receives the question with as little a time offset as possible, for example by receiving data of the first microcontroller 12 or by an interrogation by the second microcontroller 20. In method step 208, the currency of the question is checked by the second microcontroller 20, for example by comparison with a stored earlier question which must be different or by evaluating a status bit which is sent by the first microcontroller 12 together with the question. If the second microcontroller 20 finds that the question communicated to it is not current, an error counter is incremented in method step 210 or if a particular point is exceeded, an error reaction is initiated. Otherwise, the second microcontroller 20 begins in method step 212 to form the second contribution of the answer which is to be communicated to the watchdog 10.

In method step 214, the second microcontroller 20 calculates the second contribution of the answer which is to be communicated to the watchdog 10 and communicates it to the first microcontroller 12 either by sending the data to the first microcontroller 12 or by providing for an enquiry by the first microcontroller 12. In method step 216, the first microcontroller 12 takes over the second contribution of the answer and determines in method step 218 the currency of the contribution of the answer, for example by comparison with a stored preceding answer contribution which must be different, or by evaluating a status bit which the first microcontroller 12 sends along with the question. If the evaluation is negative, an error counter is incremented in method step 220 or if a threshold is exceeded, an error reaction is initiated. At the same time, the first microcontroller 12 calculates in method step 204 the first contribution of the answer which is to be sent to the watchdog. In method step 222, the first microcontroller combines the first and the second contribution of the answer to form a total answer and sends this total answer as a message in the appropriate time window to watchdog 10 (method step 224).

If the method according to the disclosure is applied in the case of more than two microcontrollers, the first microcontroller 12 can receive a multiplicity of answer contributions and combine these to a total answer at the watchdog 10. In this context, the assembling of the various answer contributions does not necessarily have to take place in the first microcontroller 12 but can also take place alternately in different microcontrollers.

In an exemplary embodiment not shown in detail, the second contribution of the answer which is formed by the microcontroller 12 consists only of a digital word.

This is advantageous especially when the safety requirements for the second microcontroller 12 are relatively low and a less complex checking of a particular number of software modules of the second microcontroller 20 is sufficient. In this context, the number of bits of the digital word must be greater than or equal to the number of software modules of the second microcontroller 20 to be checked. The bits of the digital word are set to a logic of 0 at the beginning of a time interval defined by a question/answer cycle, for example on communication of a new question by the watchdog. The multiplicity of software modules to be checked is thereupon called up in a particular order and the corresponding bit of the digital word is set to a logic of 1 if the associated software module has been executed successfully. An additional bit of the digital word can represent the presence of a new question without which setting of the remaining individual bits is not permitted.

In a further exemplary embodiment not shown in greater detail, the second contribution of the answer, which is formed by the second microcontroller 20, comprises, apart from the digital word described, only a question-specific component which is formed especially by reading out a table stored in the second microcontroller 20.

In a further exemplary embodiment not shown in greater detail, a value of a bit of the digital test word is changed only if an error is found during the checking of a software module associated with the bit. This ensures that the second microcontroller 20 has understood the question asked of it correctly and has executed all software modules to be checked at least once within the predetermined time interval.

The invention claimed is:

1. A method for monitoring at least two microcontrollers using a watchdog, comprising:
   allocating the watchdog to a first microcontroller;
   monitoring a communication of a message of the first microcontroller within a time interval having a predetermined duration with the watchdog, wherein the message communicated to the watchdog by the first microcontroller contains a contribution which is formed as a consequence of a communication between the first microcontroller and a second microcontroller connected to the first microcontroller; and
   checking a correct method of operation of the second microcontroller with the watchdog on the basis of the contribution.

2. The method as claimed in claim 1, wherein:
   the message of the first microcontroller includes an answer to a question which has previously been communicated to the first microcontroller by the watchdog, and
   the question was communicated to the first microcontroller at a starting time of the time interval having the predetermined duration.

3. The method as claimed in claim 2, wherein the answer includes (i) a first contribution which is formed by the first microcontroller, and (ii) a second contribution which is formed by the second microcontroller and is communicated to the first microcontroller.

4. The method as claimed in claim 3, wherein the question is communicated to the second microcontroller by the first microcontroller before the second contribution of the answer is formed by the second microcontroller.

5. The method as claimed in claim 3, wherein:
   the first contribution of the answer, which is formed by the first microcontroller, includes a component-specific component which results from a check of at least one system component of the first microcontroller, and
   the at least one system component includes at least one of a logic of a main processor of the first microcontroller, and a function-specific component which results from a check of a plurality of software modules of the first microcontroller.

6. The method as claimed in claim 3, wherein:
   the second contribution of the answer, which is formed by the second microcontroller, includes a component-specific component which results from a check of at least one system component of the second microcontroller, and
   the at least one system component includes at least one of a logic of a main processor of the second microcontroller and a function-specific component which results from a check of a plurality of software modules of the second microcontroller.

7. The method as claimed in claim 3, wherein:
   the second contribution of the answer, which is formed by the second microcontroller, consists only of a digital word, and
   individual bits of the digital word represent the correct method of operation of individual software modules of the second microcontroller.

8. The method as claimed in claim 3, wherein:
   the second contribution of the answer, which is formed by the second microcontroller, consists only of (i) a question-specific component which is formed by reading out a table stored in the second microcontroller, and (ii) a digital word, and
   individual bits of the digital word represent the correct method of operation of individual software modules of the second microcontroller.

9. The method as claimed in claim 1, wherein the watchdog increments an error counter with at least one detected error of the first microcontroller or the second microcontroller, or initiates a safety-related process when the error counter has reached a predetermined value.

10. A circuit arrangement comprising:
    a first microcontroller;
    a watchdog allocated to the first microcontroller; and
    at least one second microcontroller connected to the first microcontroller,
    wherein the circuit arrangement is configured to execute a method for monitoring at least the first microcontroller and the at least one second microcontroller,
    wherein the method includes
       allocating the watchdog to the first microcontroller,
       monitoring a communication of a message of the first microcontroller within a time interval having a predetermined duration, wherein the message communicated to the watchdog by the first microcontroller contains a contribution which is formed as a consequence of a communication between the first microcontroller and the at least one second microcontroller, and
       checking the correct method of operation of the at least one second microcontroller with the watchdog on the basis of the contribution.

11. A battery comprising:
    a battery management unit including a circuit arrangement,
    wherein the circuit arrangement includes a first microcontroller, a watchdog allocated to the first microcontroller, and at least one second microcontroller connected to the first microcontroller,
    wherein the circuit arrangement is configured to execute a method for monitoring at least the first microcontroller and the at least one second microcontroller, and
    wherein the method includes
       allocating the watchdog to the first microcontroller, monitoring a communication of a message of the first microcontroller within a time interval having a predetermined duration, wherein the message communicated to the watchdog by the first microcontroller contains a contribution which is formed as a consequence of a communication between the first microcontroller and the at least one second microcontroller, and checking the correct method of operation of the at least one second microcontroller with the watchdog on the basis of the contribution.

12. The battery as claimed in claim 11, wherein:
the battery is included in a motor vehicle, and
the motor vehicle is an electrical motor vehicle.

* * * * *